United States Patent
Morimoto

(10) Patent No.: US 10,189,547 B2
(45) Date of Patent: Jan. 29, 2019

(54) HYBRID CARGO HANDLING METHOD OF OIL TANKER AND CARGO PUMP PRIME MOVER SYSTEM FOR THE METHOD

(71) Applicant: Nobuyoshi Morimoto, Tokyo (JP)

(72) Inventor: Nobuyoshi Morimoto, Tokyo (JP)

( * ) Notice: Subject to any disclaimer, the term of this patent is extended or adjusted under 35 U.S.C. 154(b) by 0 days.

(21) Appl. No.: 15/552,353

(22) PCT Filed: Feb. 19, 2016

(86) PCT No.: PCT/JP2016/055735
§ 371 (c)(1),
(2) Date: Aug. 21, 2017

(87) PCT Pub. No.: WO2016/136923
PCT Pub. Date: Sep. 1, 2016

(65) Prior Publication Data
US 2018/0029673 A1    Feb. 1, 2018

(30) Foreign Application Priority Data
Feb. 24, 2015    (TW) .............................. 104105986 A

(51) Int. Cl.
*H02P 27/04*     (2016.01)
*B63B 25/08*     (2006.01)
*F04B 17/03*     (2006.01)
*F04B 23/04*     (2006.01)
*F04B 49/06*     (2006.01)
*B01D 53/14*     (2006.01)
*B01D 53/18*     (2006.01)
*F01K 7/16*      (2006.01)
*F01K 19/00*     (2006.01)

(52) U.S. Cl.
CPC .......... *B63B 25/08* (2013.01); *B01D 53/1418* (2013.01); *B01D 53/1493* (2013.01); *B01D 53/185* (2013.01); *F01K 7/16* (2013.01); *F01K 19/00* (2013.01); *F04B 17/03* (2013.01); *F04B 23/04* (2013.01); *F04B 49/06* (2013.01); *H02P 27/04* (2013.01); *B01D 2252/1035* (2013.01); *F04B 2203/0404* (2013.01)

(58) Field of Classification Search
CPC ......... C23C 16/40; C23C 16/401; C09D 7/61; C09D 7/183; C09D 7/14; C09D 5/002; C09J 11/04; C09J 183/14; C08K 3/36
See application file for complete search history.

(56) References Cited

U.S. PATENT DOCUMENTS
2008/0028742 A1    2/2008  Parsons

FOREIGN PATENT DOCUMENTS

| JP | 59-13094     | 1/1984  |
|----|--------------|---------|
| JP | 5-229600     | 9/1993  |
| JP | 2009-247104  | 10/2009 |
| JP | 2000-9040    | 1/2011  |
| JP | 2011-178250  | 9/2011  |
| JP | 2015-24808   | 2/2015  |

OTHER PUBLICATIONS

International Search Report, PCT/JP2016/055735, dated Jul. 19, 2016.
European Search Report for EP 16755667, dated Sep. 18, 2018.

*Primary Examiner* — Jason K Niesz
(74) *Attorney, Agent, or Firm* — Andrus Intellectual Property Law, LLP

(57) ABSTRACT

Oil tanker and or ore/oil carrier can take more good fuel oil consumption through cargo oil handling by usage of electric motor driven system instead of steam turbine driven cargo pump system. Its merit is about 20%.

4 Claims, 5 Drawing Sheets

HYBRID CARGO HANDLING METHOD OF OIL TANKER AND CARGO PUMP PRIME MOVER SYSTEM FOR THE METHOD

CROSS-REFERENCE TO RELATED APPLICATIONS

This application is the U.S. national stage application of International Application PCT/JP2016/055735, filed Feb. 19, 2016, which international application was published on Sep. 1, 2016, as International Publication WO 2016/136923. The International Application claims priority of Taiwanese Patent Application No. 104105986, filed Feb. 24, 2015. The international application and Taiwanese application are both incorporated herein by reference, in entirety.

TECHNICAL FIELD

The present invention relates to a hybrid cargo handling method for an oil tanker and a cargo pump mover system used for the method.

The invention is applicable to oil tankers such as a product oil tanker, an ore/oil carrier, and an oil tanker including a cargo pump in a steam turbine driven cargo pump, a cargo oil tank divided into three or more grades, and a pipe system used in an ordinary merchant ship.

The invention is contrived to save fuel oil consumption under the existing expensive fuel cost market and to reduce carbon oxides due to air pollution.

BACKGROUND ART

For a long time, a steam turbine driving method has been used in a mover of a cargo pump, but this method is based on two considered aspects. One aspect is the power demand of the mover and the other aspect is the ease of a rotation control in a full range from 0 to a maximum output and the necessity of an inert gas required by a rule.

In order to meet these demands, a full set of steam turbines including a cargo pump and an auxiliary boiler system covering a required amount of steam and an inert gas have been used in conventional systems.

The steam turbine of the mover of the cargo pump consumes a lot of steam. This steam is produced by an auxiliary boiler and the auxiliary boiler is supposed to cover the full demand of the steam turbine.

During the operation of the auxiliary boiler, the inert gas can be produced using an exhaust gas of this auxiliary boiler. According to a rule for following safety conditions of a cargo pipe for a cargo oil tank during cargo oil handling and other processes of cleaning the cargo oil sorting tank, the inert gas is supplied to a void space of the cargo oil sorting tank.

The fuel oil is consumed to produce the inert gas itself. If the inert gas is produced by other independent systems, the fuel oil consumption will be reduced due to this produced inert gas.

Patent Literature 1 discloses an auxiliary boiler system set on a shore to produce steam for a main cargo pump handling system. Also, a scrubber for producing an inert gas to be supplied into an oil tank is provided on a shore.

The invention disclosed in Patent Literature 1 decreases the weight of the oil tanker by employing a specific approach of removing the auxiliary boiler and the scrubber to save fuel consumed during normal sailing.

CITATION LIST

Patent Literature

Patent Literature 1: JP 1993-229600 A

SUMMARY OF INVENTION

Technical Problem

Such an oil tanker having a reduced weight will be limited in terms of properties.

Thus, the invention provides a method and a system for saving fuel oil consumption and reducing carbon oxides due to air pollution without adopting such an approach.

Solution to Problem

In order to save fuel and reduce carbon oxides according to the invention, one set of a cargo pump operation system among the cargo pump operation systems for the cargo oil tanks segregating more than three kinds of grade cargo oil, especially the cargo oil tanks segregating three or four kinds of grade cargo oil are changed from the steam turbine drive system into the electric motor drive system. Accordingly, it is possible to provide a highly efficient cargo handling method in consideration of a balance of an inert gas supply amount in the auxiliary boiler.

The electric motor drive system needs to exhibit the performance even when the system is driven at any rotation speed within a full operation range of the cargo pump in accordance with a cargo oil handling demand.

For this reason, a rotation control system is used in the electric motor. The rotation control system can be used for any purpose, but in consideration of the motor rotation control and the efficiency of the system, a frequency control using a power thyristor (diode) to a power supply line is the most preferable means for the rotational speed control.

The invention is applicable to the steam turbine driven cargo pump and includes the electric motor driven cargo pump.

One set of a steam turbine driven cargo pump is changed as an electric motor cargo pump. The other cargo pumps are driven by the steam turbine.

Advantageous Effects of Invention

According to the invention, the total thermal efficiency of the main cargo pump handling system is changed drastically. As a result, about 10 to 15% of fuel oil is saved for each cargo handling from the tanker. This means that the discharge amount of carbon oxides to the atmosphere is less than conventional systems while fuel is saved.

According to the basic knowledge of the mover, the steam turbine drive system has a key weakness compared to others. The steam turbine drive system produces steam by the boiler, the produced steam is used in a steam machine such as one or two stages of steam turbines, and the steam discharged from the steam turbines is condensed with latent heat loss. These cause a large loss in the total system.

The power source in the invention is two kinds of steam and electric power. This means that the degree of freedom of cargo handling increases. Electric cargo pumps are available if there is a failure in the steam turbine drive system.

The electric motor driven pump can be easily used from 0 to the full rotation range and can be easily stopped and started only by the control system of the cargo pump. A work on the mover side is not necessary.

Further, this system has two merits below.

(1) This system can be changed with almost no additional cost. This is because the electric motor drive system can reduce the auxiliary boiler capacity and reduce one set of a steam turbine. All auxiliary boiler systems including condensers are smaller in size and capacity.

(2) The system can be changed more easily when the system is equipped with side thrusters in the tankers or the ore carriers. This is because an appropriate system can be constructed when the electric power demand condition is set in consideration of the electric power balance accompanying the steering operation by the side thrusters.

DESCRIPTION OF EMBODIMENTS

First Embodiment

An embodiment of the invention is illustrated in the attached drawings.

Figure 2:
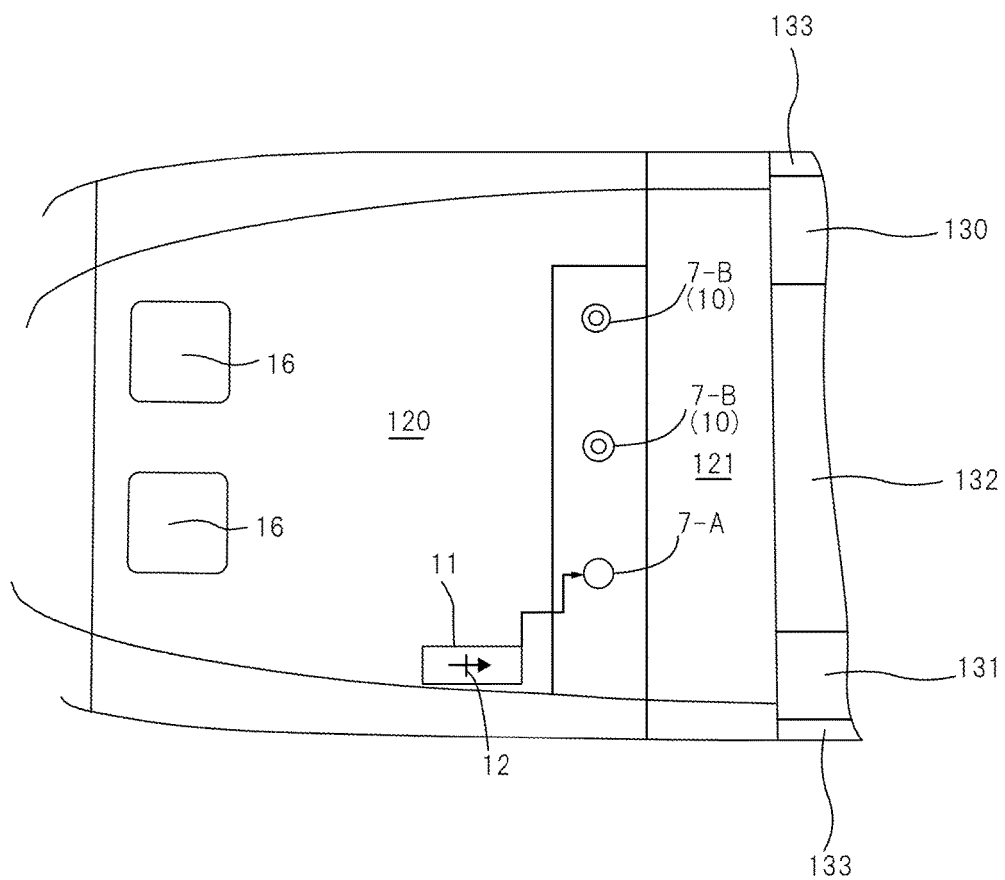
FIG. 2 is a conceptual top view of the application having the combination of cargo pumps driven by the mover of the steam turbine and the electric motor.

FIG. 2 is a conceptual diagram and illustrates an engine room (120) on a bottom shell (15) and its peripheral area as a part of an oil tanker. Cargo oil tanks (130, 131, and 132) and a ballast tank (133) are provided in front of a cargo pump chamber. The rear side of the cargo pump chamber is a stern side of a ship. A residential area and a chimney area are provided above the engine room (120).

In the inventive example, one set of a cargo pump (7-A) driven by an electric motor drive system (11) and two sets of cargo pumps (7-B) and (7-B) driven by a steam turbine (10) are provided.

That is, three cargo pumps (7-A), (7-B), and (7-B) are provided for the cargo oil sorting tanks (130, 131, and 132) separately storing three grades of cargo oil.

The electric motor drive system (11) includes a power thyristor inverter system (12) along with a conductance or a reactance and can control a cargo pump rotation in a full range.

Further, an additional supply system of boiler water such as condensate, supply water, CWC, and FWC is provided in addition to a fuel oil combustion system, a steam drive system, a system of an auxiliary boiler (16), a condenser, a condensate pump, and a supply water pump.

Figure 1:
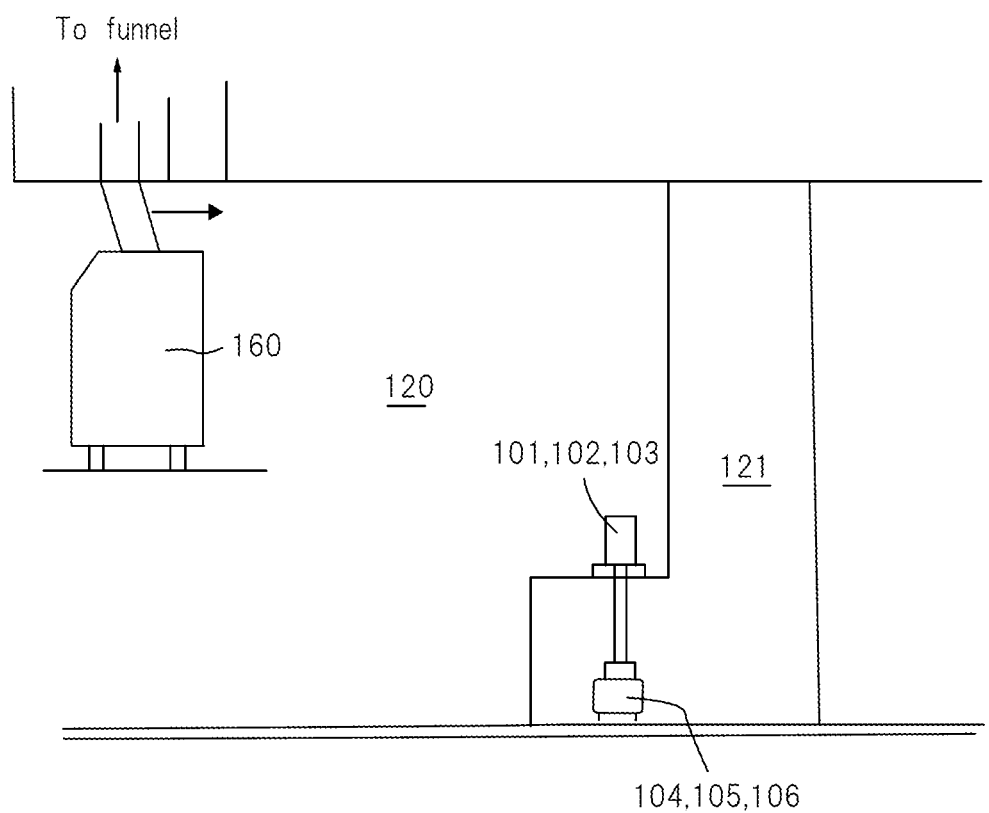
FIG. 1 is a conceptual side view of an application having a combination of cargo pumps driven by a mover of a steam turbine and an electric motor.

As illustrated in FIG. 1, the mover of the cargo pump is used to drive the cargo pump through an elongated vertical shaft passing through a seal box mounted on a partition wall.

The cargo pump is safely held inside the cargo pump chamber (121) and the mover is assembled inside the engine room (120).

Second Embodiment

Figure 3:
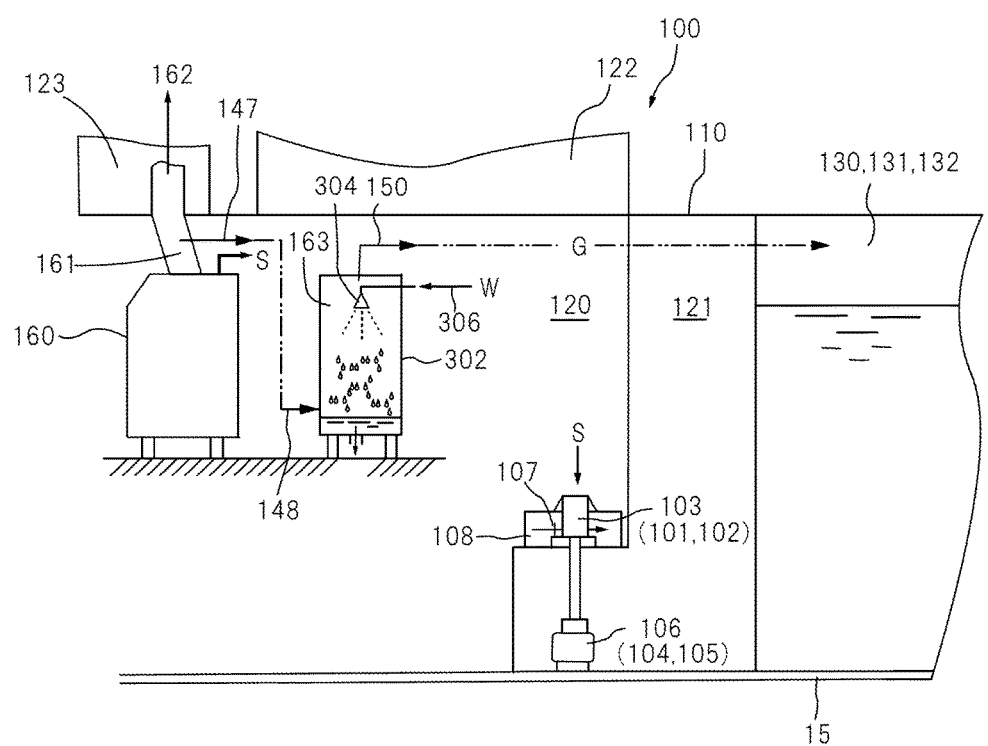
FIG. 3 is a conceptual side view of an application having a combination of cargo pumps driven by a mover of a steam turbine and an electric motor according to another embodiment.
Figure 4:
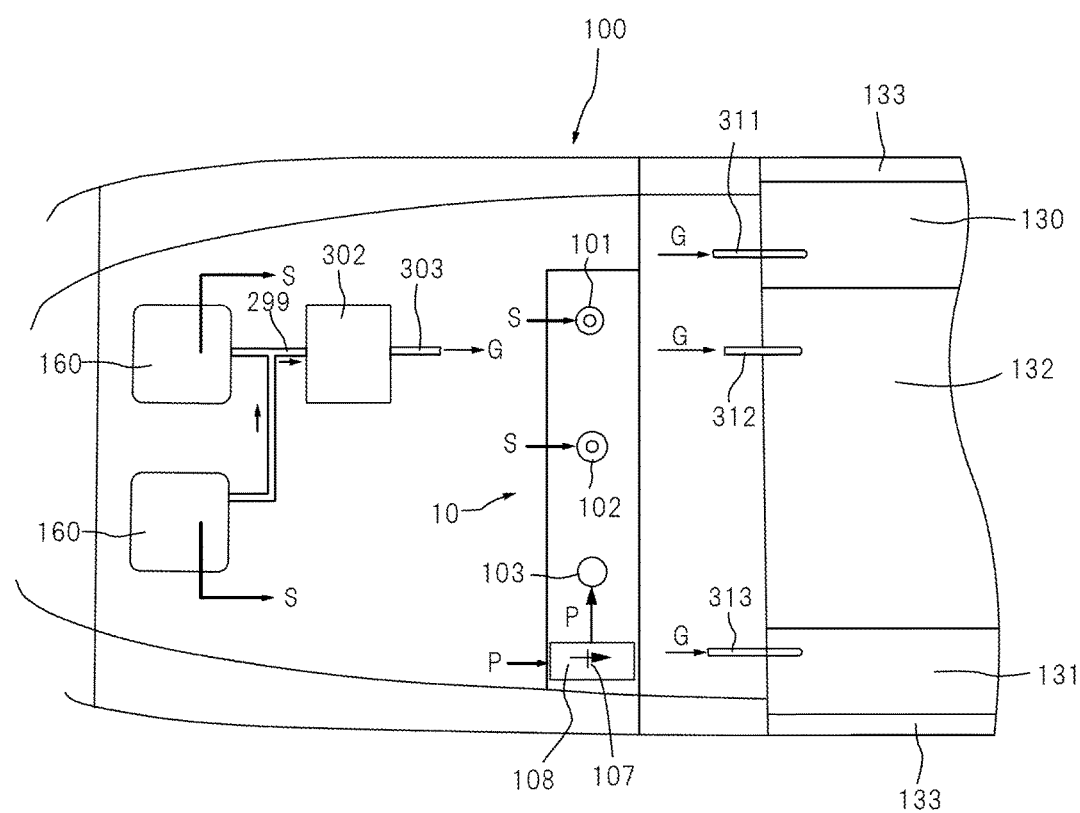
FIG. 4 is a conceptual top view of the application having the combination of cargo pumps driven by the mover of the steam turbine and the electric motor according to another embodiment.

A detailed embodiment of the invention is illustrated in FIGS. 3 and 4. FIG. 3 is a schematic conceptual side view of a system (100). FIG. 4 is a schematic conceptual top view of the system (100). FIGS. 3 and 4 illustrate elements arranged below an upper deck (110). Both movers (101 and 102) of steam turbine are used to drive cargo pumps (104 and 105) and an electric motor system (103) is used to drive a cargo pump (106).

An oil tanker illustrated in FIGS. 3 and 4 includes an engine room (120) and a cargo pump chamber (121). Cargo oil sorting tanks (130, 131, and 132) and a ballast tank (133) are provided near the cargo pump chamber (121). The rear side of the engine room (120) is a stern side of a ship. A residential section (122) and a chimney section (123) are provided in the vicinity of the engine room (120). Reference Numeral (110) indicates an upper deck.

In the invention, one set of the electric motor system (103), the cargo pump (106) driven by the motor system, two sets of the steam turbine movers (101 and 102), and the cargo pumps (104 and 105) driven by the movers are illustrated in the drawings.

As illustrated in FIG. 3, the cargo pump mover is used to drive the cargo pumps (104, 105, and 106) through elongated vertical shafts passing through a seal box mounted on a partition wall.

The cargo oil pump system (100) which is an embodiment of the invention and is used for the oil tanker or the ore/oil carrier is applied to the oil tanker or the ore/oil carrier separately carrying three or four kinds of grade of cargo oil.

The oil pump system (100) of the embodiment can be modified as below.

As illustrated in FIGS. 3 and 4, the system of the cargo pumps (104, 105, and 106) for the cargo oil sorting tanks (130, 131, and 132) storing three or four kinds of grade of cargo oil in the oil tanker or the ore/oil carrier includes one set of the cargo oil pump (106) which is driven by the electric motor system (103); the remaining cargo oil pumps (104 and 105) which is driven by the steam turbine movers (101 and 102); and one or plural auxiliary boilers (160) which produce steam for the steam turbine movers (101 and 102) and an exhaust gas purified into an inert gas (163) above a scrubber (302) to be sent to void spaces of the cargo oil sorting tanks (130, 131, and 132) for different oil grades; wherein the electric motor system (103) includes a frequency conversion control device (108) and balances a pump capacity with respect to a residual inert gas balance, and wherein a gas from the auxiliary boiler (160) is sent to the void space of the cargo oil sorting tank through passages (147, 148, and 150) and passages (299, 303, 311, 312, and 313).

As a system using the system (100) according to another embodiment of the invention, a cargo pump system for the oil tanker or the ore/oil carrier separately storing three or four kinds of grade of cargo oil includes: one or plural auxiliary boilers (160) which produce steam for steam turbine movers (101 and 102); a scrubber (302) which purifies an exhaust gas discharged from the one or plural auxiliary boilers (160) into an inert gas; an exhaust gas passage (161) which allows the one or plural auxiliary boilers (160) to be in gas-communication with a chimney space (123); gas passages (147 and 148) which allow the exhaust passage (161) to be in gas-communication with the scrubber (302); and gas passages (311, 312, and 313) which allow the scrubber (302) to be in gas-communication with cargo oil sorting tanks (130, 131, and 132), wherein the one or plural auxiliary boilers (160) have a capacity smaller than a capacity corresponding to a total pump capacity when all pumps (104, 105, and 106) are driven by the steam turbine movers (101 and 102).

In the scrubber (302), the exhaust gas is purified into an inert gas (163) in such a manner that sea water (W) supplied from a shower supply (306) for the sea water is sprayed by a shower nozzle (304). The produced inert gas (163) is discharged from the upper portion of the scrubber (302) and is guided into the upper portions of the oil tanks (130, 131, and 132), and here a drain trapped by the lower portion of the scrubber (302) is discharged to the outside of the ship.

In the system using the above-described method, one or plural auxiliary boilers (160) have a capacity of charging the inert gas into the void space of the cargo oil sorting tank (for example, 130) and have a capacity of charging the inert gas into the void space of the cargo oil sorting tank being in gas-communication with the cargo pump (106) driven by the electric motor system (103) with the speed control mechanism using the frequency conversion control device in the full performance operation mode while charging the inert gas into the void spaces of the tanks (for example, 130 and 132) being in gas-communication with the cargo pumps (104 and 105) driven by the steam turbine movers (101 and 102).

Figure 5:
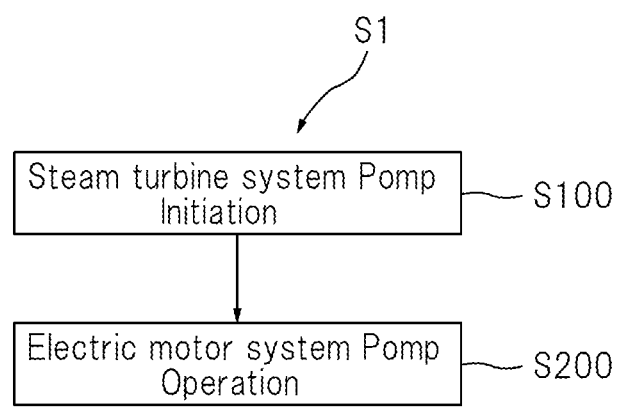
FIG. 5 illustrates steps of a method of a system according to an embodiment in an operation start mode.

This method is illustrated as a step chart in FIG. 5.

Third Embodiment

Another embodiment is a hybrid cargo handling method for oil pump systems (104, 105, and 106) and cargo oil sorting tanks (130, 131, and 132) for three or four kinds of grade in an oil tanker and an ore/oil carrier, wherein one set of the cargo oil pump (106) is driven by an electric motor system (103) of which a speed is controlled by a frequency conversion control device (108) and the remaining cargo oil pumps (104 and 105) are driven by a steam turbine drive system.

A method disclosed herein by the invention, that is, the hybrid cargo handling method for the oil pump systems and the cargo oil sorting tanks (130, 131, and 132) for three or four kinds of grade in the oil tanker and the ore/oil carrier is illustrated in FIG. 5.

Two steps are as below.

First, step 1 is a steam turbine mover pump starting step (S100).

Second, step 2 is an electric motor system pump operating step (S200).

An aspect of the invention is specifically used in combination with the above-described components and the step (S1) includes the following steps: (i) step (S100) of starting the cargo oil pumps (104 and 105) driven by the steam turbine movers (101 and 102) to discharge steam produced from the auxiliary boiler (160) at a minimum load; and (ii) step (S200) of operating the oil pump (106) driven by the electric motor system (103) after an inert gas purified from an exhaust gas and charged into void spaces (for example, 130 and 132) of the cargo oil sorting tanks being in gas-communication with the cargo oil pumps (104 and 105) driven by the steam turbine movers (101 and 102) exceeds a minimum demand threshold value to control a speed with a frequency conversion control device so that the oil pump (106) driven by the electric motor system (103) does not exceed a load equivalent to consuming surplus of residual inert gas balance allocated to the void spaces (for example, 130 and 132) of the cargo oil sorting tanks being in gas-communication with the steam turbine movers (101 and 102).

The above-described embodiment of the invention illustrates a remarkable energy saving result in total and realizes a drastically improved efficiency of the cargo pump handling system. As a result, 10 to 15% or more of fuel consumption amount can be saved for each cargo handling from the tanker. This means that the discharge amount of carbon oxides to the atmosphere is less than conventional systems while fuel is saved.

At the same time, even when the inert gas supply for charging the inert gas into the void space of the cargo oil sorting tank meets the demand of the void space by the electric motor driven oil pump (106) during the oil pump operation, the oil pump (106) driven by the electric motor system (103) is controlled by the frequency conversion control device so as not to exceed a load more than the remaining balance allocated to the void spaces of the cargo oil sorting tanks (for example, 130 and 132) being in gas-communication with the steam turbine movers (101 and 102).

This is because of the following reasons. In the main cargo handling performance, the electric motor does not consume steam and the auxiliary boiler operation itself is not necessary.

The electric motor just needs the auxiliary boiler in order to charge the inert gas into the void space of the tank. Thus, producing the exhaust gas for the performance of the electric motor is a good point in terms of utilizing the heat of the steam turbine.

The combination of the electric motor and the steam turbine uses the frequency conversion control device of the motor rotation speed and maximizes the system performance by optimizing the appropriate load balance of the steam turbine mover/electric motor from the viewpoint of the predetermined total pump performance and the production of the inert gas by the auxiliary boiler and is involved with the auxiliary boiler capacity/minimum load threshold value.

While the invention has been described in detail in terms of the embodiments herein, the applicant does not intend to limit the scope of the appended claims in any way. Additional advantages and modifications will be understood by those skilled in the art. Moreover, the elements described in one embodiment may be employed in other embodiments. Accordingly, the invention in a broad aspect is not limited to the specific details, apparatuses, and embodiments which are disclosed and described herein. Therefore, the invention can be modified from these details without departing from the spirit and the scope of the applicant's general inventive concept.

INDUSTRIAL APPLICABILITY

The invention is applicable to shipbuilding and marine transportation industries with cargo pumps used as steam turbine driven cargo pumps for three or more grade isolated cargo oil tankers, ore/oil carriers, and product oil tankers.

REFERENCE SIGNS LIST

7-A cargo pump
7-B cargo pump
10 steam turbine
11 electric motor 12 power thyristor inverter system
15 bottom shell
16 auxiliary boiler
99 ore/oil cargo oil sorting tank
100 main cargo pump handling system
101 mover of steam turbine
102 mover of steam turbine
103 electric motor system
104 cargo pump driven by steam turbine
105 cargo pump driven by steam turbine
106 cargo pump driven by electric motor
108 frequency conversion control device
110 upper deck
120 engine room
121 cargo pump chamber
122 residential section
123 chimney space
130 cargo oil sorting tank
131 cargo oil sorting tank
132 cargo oil sorting tank
133 ballast tank
147 gas passage
148 gas passage
150 gas passage
160 auxiliary boiler
161 exhaust gas passage
162 toward chimney
163 inert gas
299 gas passage
302 scrubber
304 shower nozzle
306 sea water supply
311 gas passage
312 gas passage
313 gas passage
S100 steam turbine mover starting step
S200 electric motor system pump operating step
S steam from boiler
G inert gas from scrubber
W sea water

The invention claimed is:

1. A hybrid cargo handling method for an oil tanker or ore/oil carrier comprising:
   segregating and carrying at least three kinds of grade cargo oil; and
   using plural sets of cargo oil pump systems,
   wherein a cargo oil pump of one set of the systems is driven by an electric motor system of which a speed is controlled with a frequency conversion control device, and
   wherein a cargo oil pump of a remaining set of the systems is driven by a steam turbine drive system,
   further comprising the following steps of:
   (i) operating the cargo oil pump driven by a mover of a steam turbine and discharging an exhaust gas from an auxiliary boiler supplying steam to the steam turbine; and
   (ii) charging an inert gas purified from the exhaust gas into a void space of a cargo oil sorting tank being in gas-communication with the cargo oil pump driven by the mover of the steam turbine,
   while operating the cargo oil pump driven by the electric motor system when exceeding a minimum demand threshold value of the inert gas
   to control a speed with a frequency conversion control device so that the cargo oil pump driven by the electric motor system does not exceed a load equivalent to consuming surplus of residual inert gas balance allocated to the void space of the cargo oil sorting tank being in gas-communication with the mover of the steam turbine.

2. A hybrid cargo system of an oil tanker or ore/oil carrier segregating and carrying at least three kinds of grade cargo oil, comprising:
   plural sets of cargo oil pump systems,
   wherein a cargo oil pump of one set of the systems is driven by an electric motor system of which a speed is controlled with a frequency conversion control device,
   wherein a cargo oil pump of a remaining set of systems is driven by a steam turbine drive system, and
   wherein the cargo oil pump systems of the oil tanker or ore/oil carrier segregate at least three kinds of grade cargo oil and comprise,
   in addition to the cargo oil pump of the one set of the systems which is driven by the electric motor system, further
   the cargo oil pump of the remaining set of the systems which is driven by a mover of a steam turbine; and
   one or plural auxiliary boilers which produce steam to be used in the steam turbine and an exhaust gas to be purified into an inert gas by a scrubber-for a cargo oil sorting tank for all kinds of grades of cargo oil,
   wherein the electric motor system includes a frequency conversion control device and the inert gas is allocated to a void space of the cargo oil sorting tank being in gas-communication with the auxiliary boiler through a passage and a residual inert gas is charged into a void space of the cargo oil pump driven by the steam turbine, by controlling pump capacity equivalent to the residual inert gas balance.

3. The hybrid cargo system according to claim 2, comprising:
   the one or plural auxiliary boilers which produce the steam for the steam turbine; and
   the scrubber which purifies the exhaust gas discharged from the one or plural auxiliary boilers into the inert gas; and further
   an exhaust gas passage of the auxiliary boiler;
   a gas passage which allows the exhaust gas passage to be in gas-communication with the scrubber; and
   a gas passage which allows the scrubber to be in gas-communication with the cargo oil sorting tank,
   wherein the one or plural auxiliary boilers have less capacity than capacity corresponding to total pumps driven by the mover of the steam turbine.

4. A hybrid cargo system of an oil tanker or ore/oil carrier segregating and carrying at least three kinds of grade cargo oil, comprising:
   plural sets of cargo oil pump systems,
   wherein a cargo oil pump of one set of the systems is driven by an electric motor system of which a speed is controlled with a frequency conversion control device,
   wherein a cargo oil pump of a remaining set of systems is driven by a steam turbine drive system, and
   wherein a pump for the electric motor system of which the speed is controlled with the frequency conversion control device, in a full performance operation mode, has enough capacity to charge an inert gas from one or plural auxiliary boilers into a void space of a tank being in gas-communication with the pump for the electric motor system while the cargo oil pump driven by a mover of a steam turbine charges the inert gas into a void space of a tank being in gas-communication with the cargo pump.

\* \* \* \* \*